(12) United States Patent
Won

(10) Patent No.: US 6,950,686 B2
(45) Date of Patent: Sep. 27, 2005

(54) COVER OPENING/CLOSE DEVICE OF MOBILE TERMINAL

(75) Inventor: Jong-Lim Won, Incheon (KR)

(73) Assignee: TKE Co., Ltd., Gyeonggi-do (KR)

( * ) Notice: Subject to any disclaimer, the term of this patent is extended or adjusted under 35 U.S.C. 154(b) by 402 days.

(21) Appl. No.: 10/107,325

(22) Filed: Mar. 28, 2002

(65) Prior Publication Data

US 2002/0160727 A1 Oct. 31, 2002

(30) Foreign Application Priority Data

Apr. 25, 2001 (JP) .......................................... 2001-11899

(51) Int. Cl.[7] ................................................ H04B 1/38
(52) U.S. Cl. ............................. 455/575.3; 379/433.13; 455/550.1; 455/575.1; 455/90.3
(58) Field of Search .......................... 455/550.1, 575.1, 455/575.3, 90.3; 379/433.13

(56) References Cited

U.S. PATENT DOCUMENTS

| | | | | |
|---|---|---|---|---|
| 5,628,089 A | * | 5/1997 | Wilcox et al. ................. | 16/303 |
| 5,697,124 A | * | 12/1997 | Jung ............................ | 16/341 |
| 5,923,751 A | * | 7/1999 | Ohtsuka et al. ......... | 379/433.13 |
| 5,937,062 A | * | 8/1999 | Sun et al. .............. | 379/433.13 |
| 6,065,187 A | * | 5/2000 | Mischenko .................. | 16/341 |
| 6,115,620 A | * | 9/2000 | Colonna et al. ......... | 455/569.1 |
| 6,175,990 B1 | * | 1/2001 | Kato et al. .................... | 16/334 |

\* cited by examiner

*Primary Examiner*—Vivian Chin
*Assistant Examiner*—Sanh Phu
(74) *Attorney, Agent, or Firm*—Foley & Lardner LLP

(57) ABSTRACT

Disclosed is an opening/closing of a mobile terminal, which comprises: a housing having a polygonal section and being non-rotatably inserted into a hinge of a cover constituting the mobile terminal; elastic means inserted into the housing; a rotary cam shaft provided at one end with an insertion shaft which is inserted into the elastic means in a close contacting manner and non-rotatably contained within the housing, and at the other end with opposed cam faces, each of the cam faces being unintermittently constituted of an escarpment a, a top b and an inclination c; a shaft penetrating the rotary cam shaft, the elastic means and the housing in sequence, the shaft being provided at one end with a stepped recess into which a snap ring is fastened to prevent the shaft from being released from the housing.

1 Claim, 6 Drawing Sheets

COVER OPENING/CLOSE DEVICE OF MOBILE TERMINAL

BACKGROUND OF THE INVENTION

1. Field of the Invention

The invention relates to a cover opening/closing device of a mobile communication terminal, in particular, which operates in a smooth and stable fashion and reduces the number of parts thereby to enable downsizing and save the manufacturing cost.

2. Description of the Related Art

Recently, due to development of related technologies, mobile terminals are being applied into various forms such as mobile telephone, cellular telephone and PCS. The mobile terminals are typically divided into flip-type terminals and foldable terminals according to functions and switching methods of covers.

In such flip-type or foldable terminals, the covers each are pivotally hinged to terminal bodies, in which opening/closing devices of the covers are variously applied by using contractible elastic members or a plurality of cams, for example.

Recently, however, consumers have a tendency toward such a mobile terminal with small volume and size, and accordingly the volume and size thereof are downsized. Although the above elastic members do not have many parts, they are easily worn out or permanently deformed to lose elastic forces due to the consecutive use thereof.

Therefore, in order to overcome the above problems, opening/closing devices using the cams are successively developed. However, as the number of parts increases, the opening/closing devices using the cams have sophisticated structures, and the sizes and volumes thereof are larger compared to the downsized terminals. Therefore, the above opening/closing devices have lowered practicality and require a number of process steps, thereby degrading the productivities thereof

SUMMARY OF THE INVENTION

Accordingly the present invention has been made to solve the foregoing problems of the related art and it is an object of the invention to provide a cover opening/closing device of a mobile terminal, which reduces the number of parts so as to enable downsizing thereof, enhance the productivity and ensure the smooth and stable operation thereof even in consecutive use.

According to an aspect of the invention to solve the foregoing object, it is provided with an opening/closing device of a mobile terminal comprising: a housing having a polygonal section and being non-rotatably inserted into a hinge of a cover constituting the mobile terminal; elastic means inserted into the housing; a rotary cam shaft provided at one end with an insertion shaft which is inserted into the elastic means in a close contacting manner and non-rotatably contained within the housing, and at the other end with opposed cam faces, each of the cam faces being unintermittently constituted of an escarpment a, a top b and an inclination c; a shaft penetrating the rotary cam shaft, the elastic means and the housing in sequence, the shaft being provided at one end with a stepped recess into which a snap ring is fastened to prevent the shaft from being released from the housing, and at the other end with a hinge piece fixedly inserted into a hinge of a body of the mobile terminal; and a follower protrusion projected at the outer periphery of the shaft as integral and spaced with/from the hinge piece, and being moved with the end contacting to the cam faces of the rotary cam shaft.

BRIEF DESCRIPTION OF THE DRAWINGS

The above technical features of the present invention will be understood in more detail from the following detailed description of a preferred embodiment of the invention taken in conjunction with the accompanying drawings, in which.

DETAILED DESCRIPTION OF THE PREFERRED EMBODIMENT

Although the above technical features of the invention are realized in a mobile terminal according to an embodiment in reference to the accompanying drawings, various types of mobile terminals mentioned in the introduction of the application can be applied with the same technical features, which will be defined in the accompanying claim. Hereinafter the various mobile terminals will be designated in common as mobile terminal.

Figure 1:
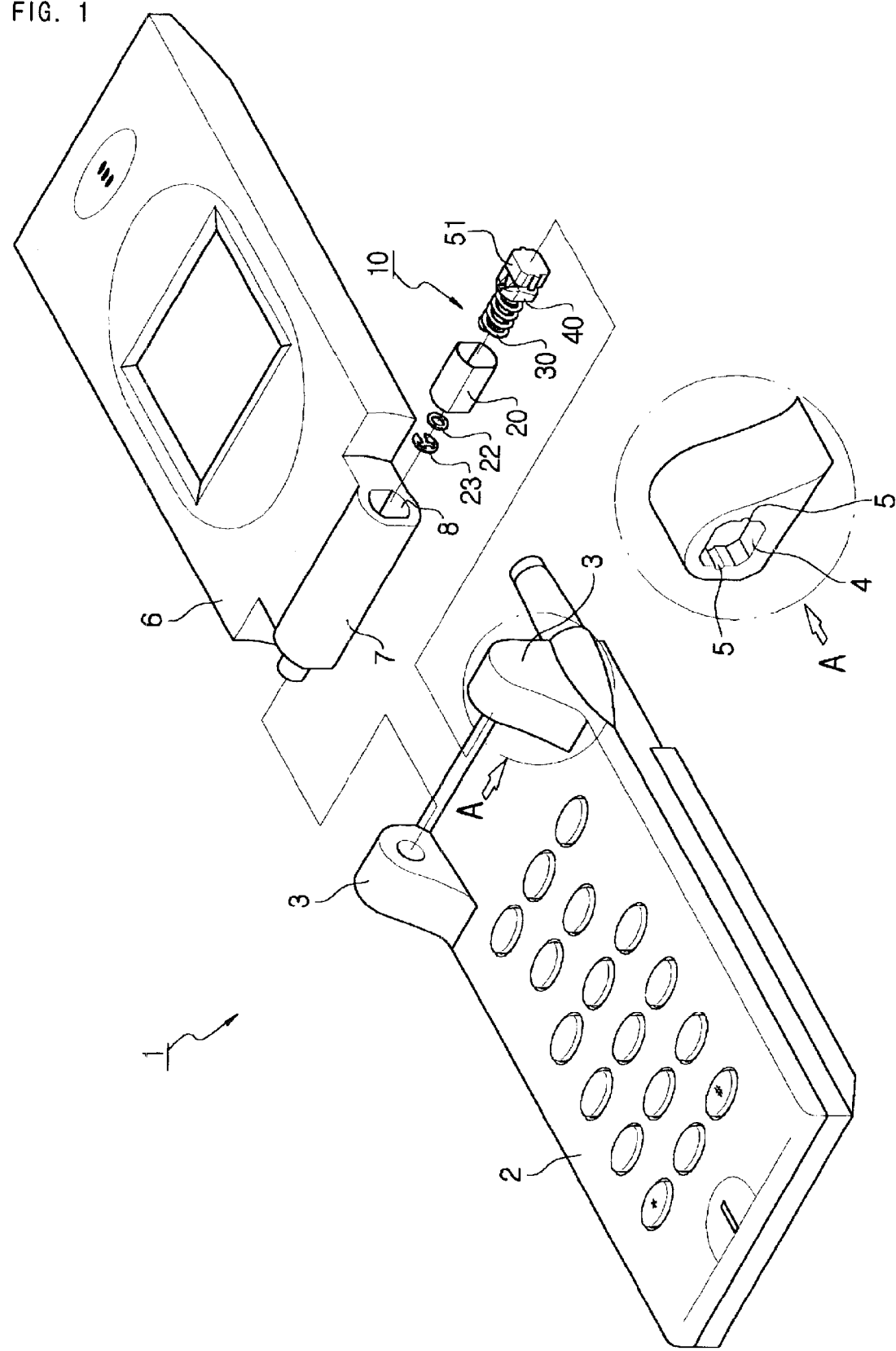
FIG. 1 is a perspective view illustrating a cover opening/closing device embodied in a general mobile telephone according to the invention.

A mobile terminal 1 as shown in FIG. 1 is a typical foldable mobile terminal comprising a body 2 which has an input key and a microphone, and a cover 6 which is pivoted to the body 2 and has a liquid crystal panel and a receiver. In the above mobile terminal 1, the body 2 and the cover 6 have hinges 3 and 7, respectively, which are hinged together to constitute a cover opening/closing device 10 of the invention.

The above hinges 3 and 7 have their own recesses 4 and 8, respectively, in which the hinge 7 of the cover 6 is inclined for 0 to 40 degree in respect to the hinge 3 of the body when the cover 6 is closed on the body 2, and parallel to the hinge 3 of the body 2 when the cover 6 is completely opened, where the cover 6 is opened for about 120 to 130 degree from the body 2.

Figure 2:
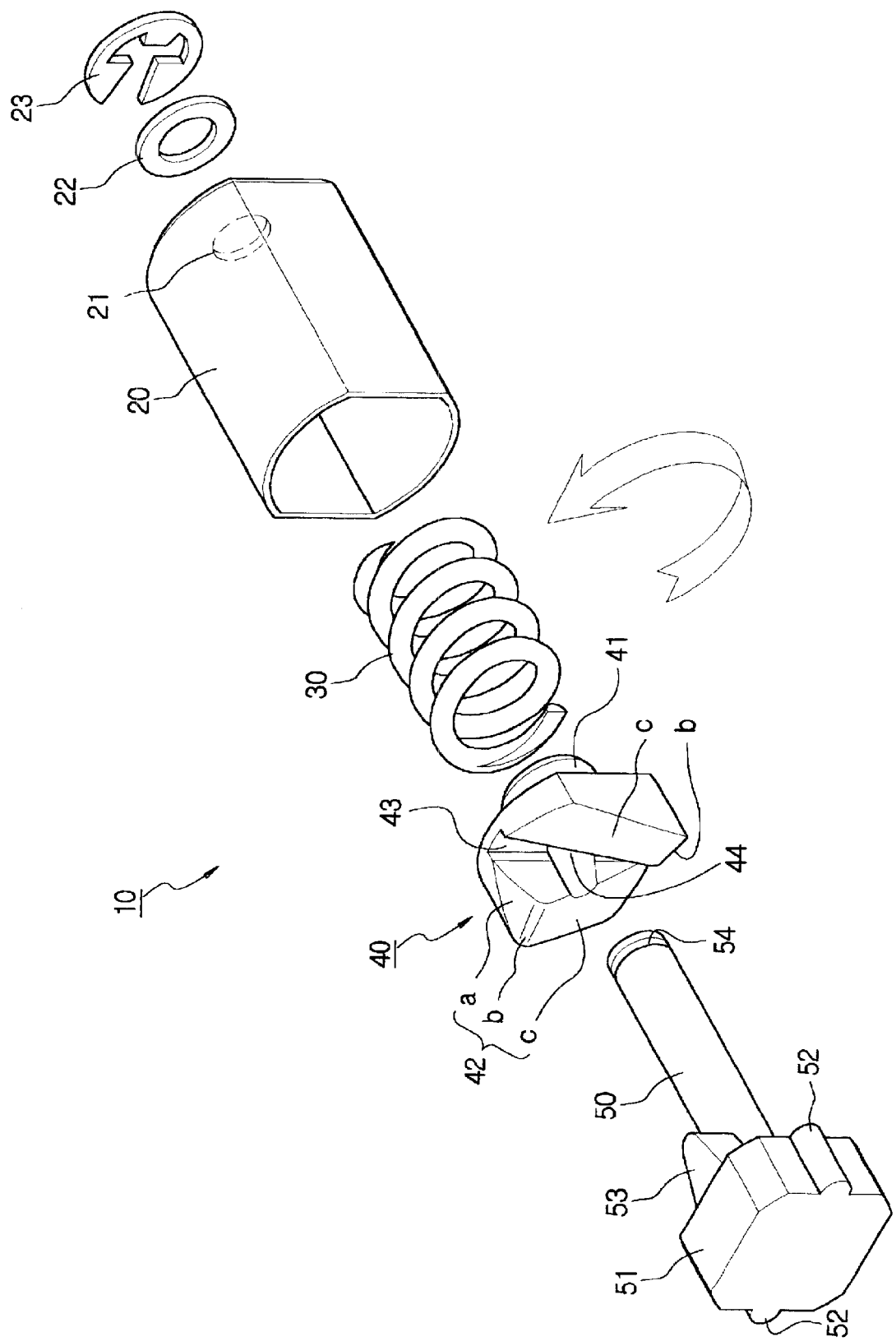
FIG. 2 is a disassembled perspective view illustrating a cover opening/closing device according to the invention.
Figure 3:
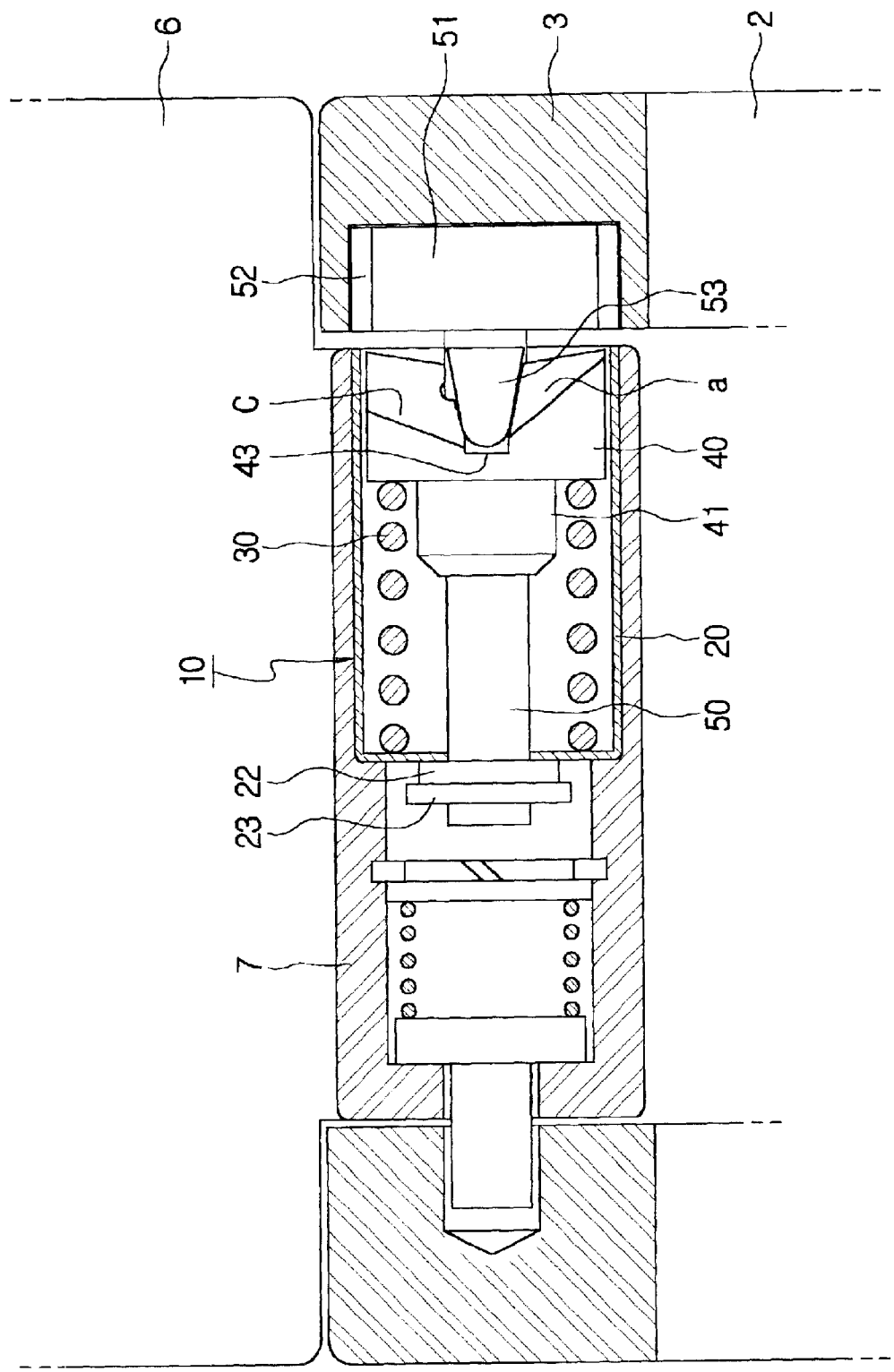
FIG. 3 is an assembled sectional view illustrating a cover opening/closing device which is opened according to the invention.

FIGS. 2 and 3 are detailed views illustrating the cover opening/closing device 10 of the invention.

As shown in FIGS. 2 and 3, the cover opening/closing device 10 includes a housing 20 having a polygonal section, preferably quadrangular section.

The above housing 20 having the substantially quadrangular section is provided at one end with a through hole 21 for receiving a shaft 50 which will be described later and at the other end with an opened structure.

The above housing 20 is inserted into the recess 8 formed in the hinge 7 of the cover 6 to be integrated with the cover 6.

Further, into the above housing 20 is inserted elastic means 30 composed of a compressive spring. The elastic means 30 is provided at one end with a rotary cam shaft 40 having a sectional shape corresponding to the housing 20. The rotary cam shaft 40 is inserted into the housing 20 in an axially movable but non-rotatable position so that the rotary cam shaft 40, the housing 20 and the cover 6 can be rotated as one unit.

The above rotary cam shaft 40 is provided at one end with a projected insertion shaft 41 and at the other end with uneven cam faces 42. The insertion shaft 41 is inserted into the elastic means 30 to prevent play of the rotary cam shaft 40. The cam faces 42 have a symmetric and separate configuration. Between the cam faces 42 is provided a fitting section 43 for catching a follower protrusion 53 of the shaft 50. In a central portion of the rotary cam shaft 40 is formed a hole 44 penetrating in an axial direction.

In the meantime, one end of the shaft 50 is inserted into the housing 20 containing the rotary cam shaft 40 and the elastic means 30 by sequentially penetrating the elastic means 30 and the through hole 21 of the housing 20 via the hole 44 of the rotary cam shaft 40. Herein, a snap ring 23 is fastened on a recess 54 of the shaft 50 which is stepped at the outer periphery thereof penetrating the through hole 21 of the housing 20 so that the shaft 50 is fixed to the housing 20.

Further, the shaft 50 is integrally provided at the other end with a hinge piece 51 which has a substantially quadrangular shape corresponding to the recess 4 and non-rotatably inserted into the shaft 50. At the outer periphery of the hinge piece 51 is provided with projections 52 which are inserted into grooves 5 of the recess 4 and caught by the same.

On the outer periphery of the shaft 50 spaced from the hinge piece 51, the follower protrusion 53 is provided as opposed to the corresponding cam faces 42 of the rotary cam shaft 40. A space between the follower protrusion 53 and the hinge piece 51 allows a lubricant to be smoothly supplied to joining sections of parts when the lubricant is injected into the opening/closing device 10 in order to ensure smooth operations of thereof. At this time, both ends of the housing 20 are preferably sealed.

The unmentioned reference number 22 designates a washer which is interposed between the housing 20 and the snap ring 23 for minimizing friction between the housing 20 and the snap ring 23.

In the meantime, each of the cam faces 42 of the rotary cam shaft 40 is provided with an escarpment a, a top b and an inclination c in sequence.

The escarpment a is a section corresponding to a closed position of the cover 6 and is so steeply sloped that the cover 6 is not spontaneously opened unless an external force is not applied thereto. The slope of the escarpment a and the elastic repulsive force of the elastic means 30 prevent the cover 6 from undergoing relative rotation by itself in respect to the follower protrusion 53. Further, the top b at the distal end of the escarpment a applies an external force to the cover 6 and defines a vertex of the cam 40 when the cover 6 is opened to function as a branch point for opening/closing the cover 6. The inclination c extended from the top 6 is slowly inclined so that the cover 6 may be spontaneously opened due to the elastic repulsive force of the elastic means 30 even though the cover 6 is not applied with the external force.

Further, the fitting section 43 at the end of the inclination c which is the lowest portion of the cam face 42 maintains a predetermined width from the starting point of the escarpment a of the opposed cam face. The follower protrusion 53 of the shaft 50 is inserted into the fitting section 43 after passing by the inclination c so that the cover 6 may maintain its opened position.

Figure 4:
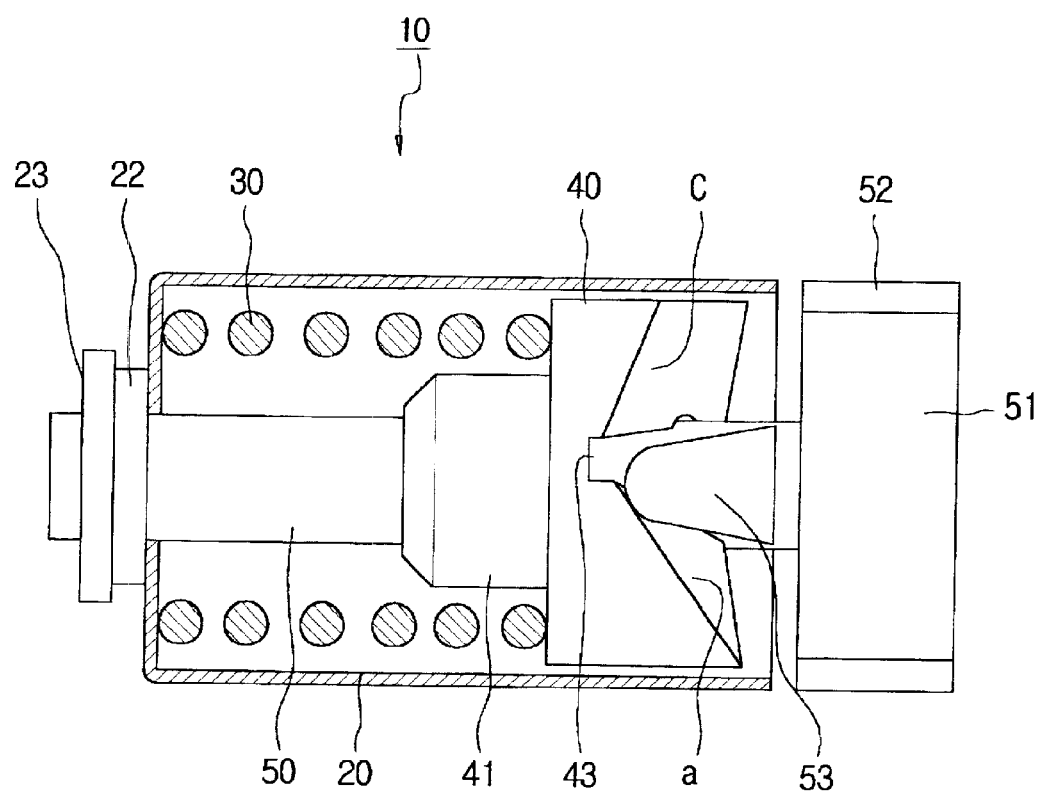
FIG. 4 is a sectional view of an important part illustrating a closed position of a cover closed according to the invention.
Figure 5:
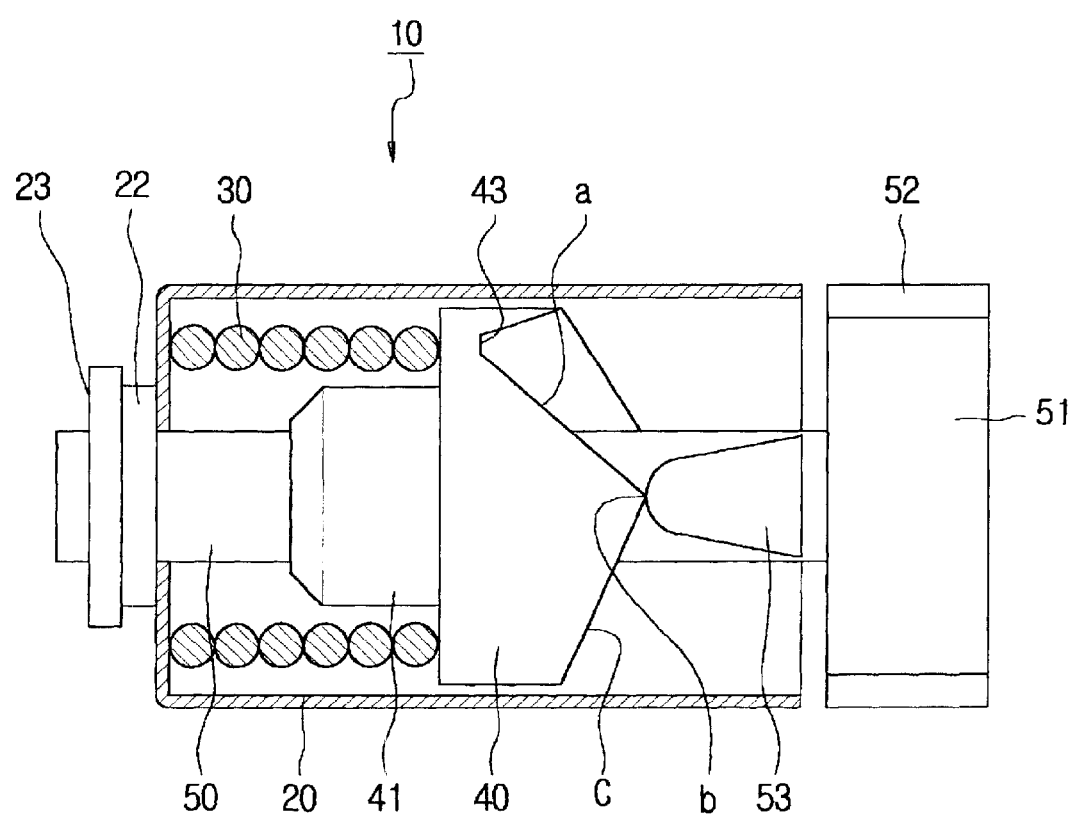
FIG. 5 is a sectional view of an important part illustrating an initial opened position of a cover according to the invention.
Figure 6:
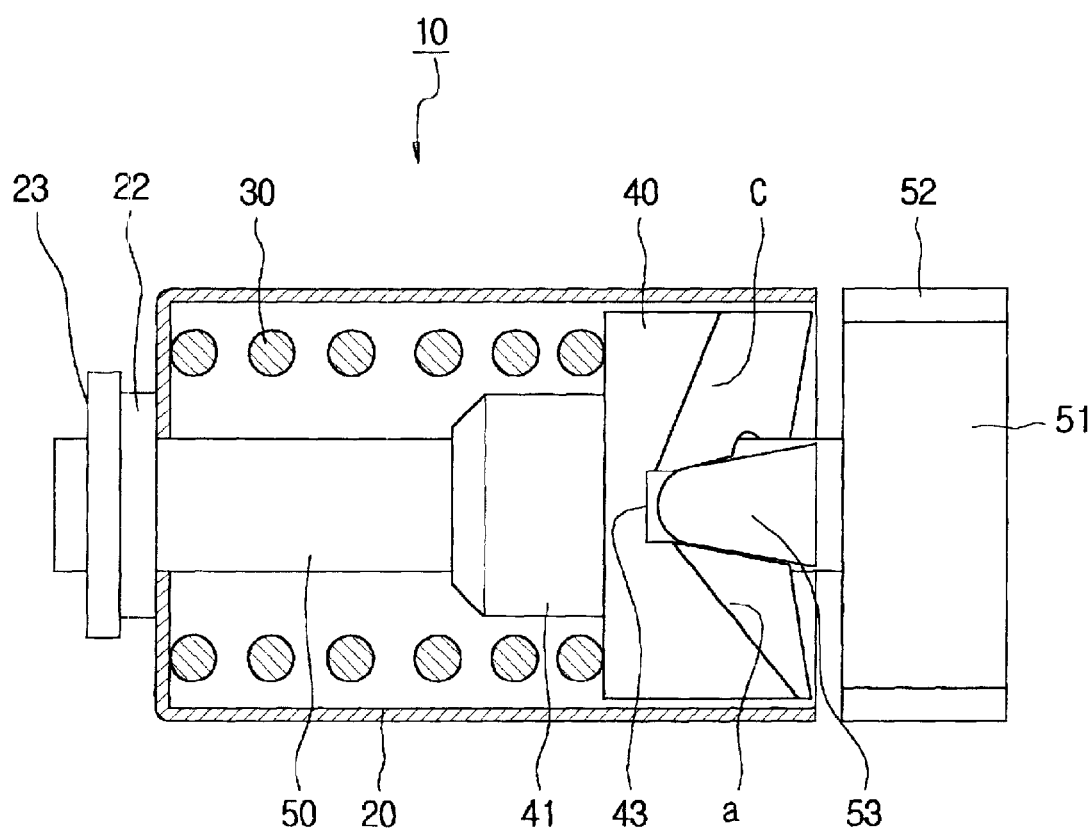
FIG. 6 is a sectional view of an important part illustrating a completely opened position of cover according to the invention.

FIGS. 4 to 6 illustrate an operational process of the cover opening/closing device of the mobile terminal according to the invention, in which FIG. 4 illustrates a position where the cover is closed.

As shown in FIG. 4, the follower protrusion 53 of the shaft 50 is positioned at one side of the escarpment a of the rotary cam shaft 40 when the cover 6 of the terminal 1 is closed.

The hinge 7 of the cover 6 is inclined for about 30 to 40 degree in respect to the hinge 3 of the body 2 so that the rotary cam shaft 40 is moved as compressing the elastic means 30 with the amount corresponding to the above inclination. When the cover 6 is closed, the follower protrusion 53 of the shaft 50 is positioned on the rotary cam shaft 40 as shown in FIG. 4.

In this case, the rotary cam shaft 40 is closely contacted to the follower protrusion 53 of the shaft 50 as pressed by the elastic means 30 composed of the compressive spring which is provided at one end of the rotary shaft 40. Due to such a elastic repulsive force of the elastic means 30 and the inclination of the escarpment a, the cover 6 can maintain a stably closed position without spontaneous rotation from the body 2 at all unless the external force is applied to the cover 6.

In use of the terminal 1, a user turns the end of the cover 6 from the body 2 by grasping the same so that the cover 6 applied with the external force is opened as shown in FIG. 5.

When the external force is applied to the cover 6 as above, the rotary cam shaft 40 contacting to the follower protrusion 53 of the shaft 50 fixed to the hinge 3 of the body 2 compresses the elastic means 30 with the cam faces 42, and is rotated together with the housing 20 and the cover 6 while moving into the housing 20.

However, if the external force applied to the cover 6 is removed before the follower protrusion 53 of the shaft 50 reaches the top 6 or the vertex of the escarpment a of the rotary cam shaft 40, the elastic repulsive force of the elastic means 30 for returning to its original position and the slope of the escarpment a overcome the rotary power of the cover 6 so that the rotary cam shaft 40 is rotated into the reverse direction to return to its initial closed position.

Therefore, when the external force applied to the cover 6 is removed before the follower protrusion 53 of the shaft completely passes the escarpment a of the rotary cam shaft 40, the cover 6 is not opened.

In the meantime, FIG. 6 shows the completely opened position of the cover 6. When the user completely turns the cover 6, the cover 6 is rotated together with the housing 20 and the rotary cam shaft 40 so that the follower protrusion 53 of the shaft 50 passes by the escarpment a and the top b of the rotary cam shaft 40 to reach the slow inclination c thereof. At this time, even if the external force applied to the cover 6 is removed, the cover 6 is automatically and completely opened due to the elastic repulsive force of the elastic means 30 provided at one end of the rotary cam shaft 40 and the slope of the inclination c.

In the cover 6 opened as above, at the same time that the follower protrusion 53 of the shaft 50 passes by the escarpment a and the top of the rotary cam shaft 40, the elastic repulsive force of the elastic means 30 is applied to the rotary cam shaft 40 to push the rotary cam shaft 40 toward the follower protrusion 53. Then, the rotary cam shaft 40 is rotated along the slow inclination c thereof contacting with the follower protrusion 53 and rotation thereof is stopped when the follower protrusion 53 is positioned at the fitting section 43 of the rotary cam shaft 40. Therefore, with rotation of the rotary cam shaft 40, the cover 6 and the housing 20 are also naturally rotated together and thus completely opened.

When the user closes the cover 6 to stop using the terminal 1, the rotary cam shaft 40 is moved into the housing 20 while compressing the elastic means 30 with the follower protrusion 53 of the shaft 50. In the housing 20, the rotary cam shaft 40 is rotated in the reverse direction of the foregoing opening operation so that the follower protrusion 53 of the shaft 50 climbs the slow inclination c, the top b and the escarpment a of the rotary cam shaft 40.

Similar to the initial opening operation as above, at a position where the follower protrusion 53 of the shaft 50 passes by the inclination c and the top b to be positioned at the escarpment a, even if the external force applied to the cover 6 is removed, the cover 6 is automatically closed due to the slope of the escarpment a and the elastic repulsive force of the elastic means 30.

In the opening/closing device 10 operated as above, the follower protrusion 53 and the rotary cam shaft 40 having the uneven cam faces 42 allows the user to actually feel the operation of the device 10 in opening/closing the cover 6. For the purpose of ensuring smooth operation of the device, the lubricant such as oil or grease may be injected into the housing 20. The injected lubricant is smoothly introduced to the joining sections among the parts through the space between the hinge piece 51 and the follower protrusion of the shaft 50 so as to serve a greasing function.

Of course, both ends of the housing 20 which the shaft 50 penetrates through are preferably sealed by using packing members such as rubber.

As set forth above according to the cover opening/closing device of the mobile terminal of the invention, the number of the parts constituting the device is reduced to downsize the same, the productivity is enhanced, and injection of the lubricant ensures smooth and stable operation of the device even if the device is continuously used.

What is claimed is:

1. An opening/closing device of a mobile terminal, comprising:

a housing having a polygonal section including a pair of parallel planar guide portions of the inner wall thereof and at least one planar portion on the outer wall thereof to be dispose in a hinge of cover constituting the mobile terminal;

elastic means inserted into the housing;

a rotary cam shaft provided at one end with an insertion shaft which is inserted into contact with said elastic means and which has a pair of planar sidewalls which slidably contact the pair of planar guide portions of said housing, and at the other end with opposed cam faces, each of said cam faces being unintermittently constituted of an escarpment a, a top b and an inclination c;

a shaft penetrating said rotary cam shaft, said elastic means and said housing in sequence, said shaft being provided at one end with a stepped recess into which a snap ring is fastened to prevent said shaft from being released from said housing, and at the other end with a hinge piece fixedly inserted into a hinge of a body of the mobile terminal; and a follower protrusion projected at the outer periphery of said shaft as integral and spaced with/from said hinge piece, and being moved with the end contacting to said cam faces of the rotary cam shaft.

* * * * *